2,752,717

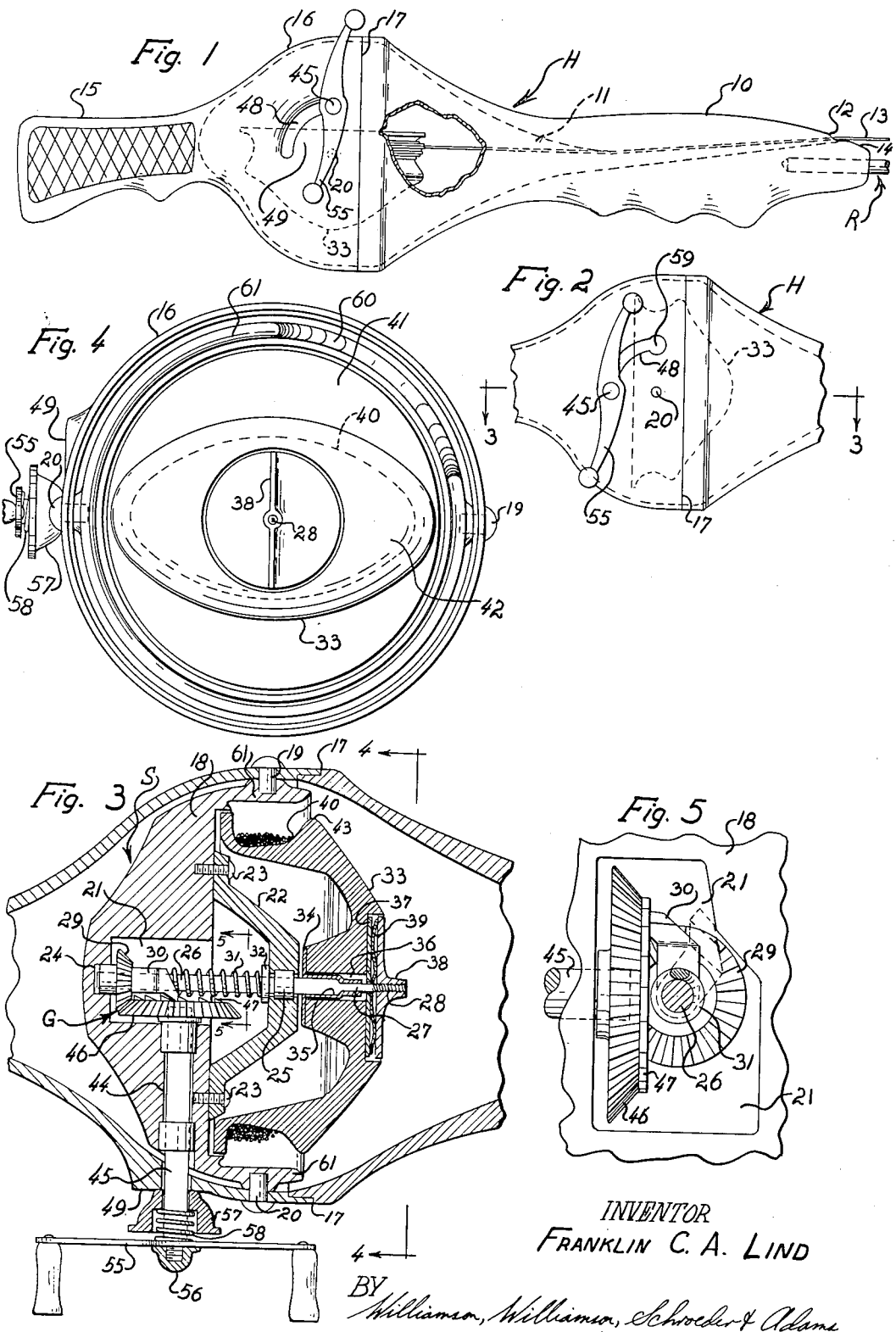

FISHING APPARATUS

Franklin C. A. Lind, Randolph, Minn., assignor of one-third to Harry R. E. Lind, Minneapolis, Minn.

Application March 22, 1952, Serial No. 278,058

3 Claims. (Cl. 43—20)

This invention relates to fishing apparatus and more particularly to an improved type of free-stripping reel.

It is a general object of this invention to furnish simple and efficient equipment which will facilitate the art of fishing for both the novice and the expert, making more effective the lures which are commonly used.

It is another object of this invention to provide for a fishing reel which will operate in an easily controlled manner to handle the bait during the casting and retrieving operation so as to lure fish with a minmum of effort and skill on the fisherman's part.

It is a further object of the invention to provide for a free-stripping type of fishing reel which will impart small and frequent jerks to the bait while it is being manually reeled in smoothly and normally so as to simulate the activity of live bait in free circumstance.

It is a further object to provide for a free-stripping type of reel in which the spool may be utilized for winding up or retrieving of the fish line but which may be shifted to a new position for endwise unwinding during casting independently of rotation of the spool while maintaining the reel crank conveniently in substantially the same plane of operation.

It is another object of the invention to provide for a handle grip arrangement in a spinning or free-stripping type of reel such that the fisherman can grasp the reel at a position to the fore of the reel or behind it, said handle grip arrangement cooperating and not interfering with the reel crank in operation to cast or to retrieve.

It is a still further object of the invention to provide for an improved type of spinning reel in which the crank handle need be simply moved but through a small distance in substantially the same plane to condition the reel either for reeling in or for strip-casting.

These and other objects and advantages of my invention will more fully appear from the following description made in connection with the accompanying drawings wherein like reference characters refer to similar parts throughout the several views and in which:

Fig. 1 is a side elevation of my reel with a portion of the housing cut away to show the spool in winding or retrieving position and the rod proper shown only in part;

Fig. 2 is a similar side elevation of my reel with portions thereof broken away to show the position of the handles and spool during the spinning or strip-casting position;

Fig. 3 is a horizontal section of a portion of my reel taken on the lines 3—3 of Fig. 2 with portions thereof broken away and some parts in full;

Fig. 4 is an end view of the spool arrangement with the forward part of the reel housing removed and looking in the direction of the arrows 4—4 of Fig. 3; and Fig. 5 is an enlarged detailed segment of the gearing and brake arrangement taken in the direction of the arrows 5—5 in Fig. 3.

Referring now more particularly to the drawing, my invention comprises a handle and housing member designated by H and which is adapted to constitute a complete reel and handle assembly for a fishing rod which is attached at the front part and shown in part at R. The handle and housing member H comprises in turn a forward portion 10 which may be molded of plastic material for lightness or may otherwise be manufactured of suitable light and strong material. The forward handle portion 10 has an opening 11 which extends therethrough, being diminished toward the forward portion and finally terminating in an orifice 12 through which the fish line 13 may be cast out and retrieved. A small flat area 14 underlies the orifice 12 so as to form a cooperating surface for retarding the forward progress of line 13 by the thumb or some mechanical equivalent. At the rear of the handle and housing member H is a hand grip 15 which may be of the pistol grip type or any other convenient single-handed grip or grasping member. At the forward part of the hand grip 15 is a flared portion which, together with the rearward flared portion of the handle 10, comprises an enlarged shell 16. The shell 16 is thin walled and may be circular in cross section as shown in Fig. 4. The two shell halves comprising enlarged shell 16 are joined at 17 so as to form a unitary space which communicates with the diminishing opening 11 without obstruction.

Internally of the space defined by the enlarged shell 16 and across the sides thereof is mounted a supporting structure S which has a main portion or yolk member 18 as shown in Fig. 3. The supporting structure S is mounted in trunnion fashion upon stub shafts 19 and 20 which in turn are fixed to the side walls of shell 16 to the rear of the joint 17. The supporting structure S is adapted to rock through a 90° angle upon the stub shafts 19 and 20 as will be presently described. Formed centrally and within the yoke 18 is a space 21 for housing gearing mechanism denoted generally as G. Overlying the hollow portion 21 and forming a part of the supporting structure is a bracket 22. The bracket 22 may be fastened to the yoke 18 by means such as bolts 23. At the base of the hollow space 21 in the yolk 18 is a bearing 24. A similar bearing 25 is disposed centrally of the bracket 22 and in alignment with bearing 24. A shaft 26 is journaled across from bearing 24 to bearing 25 and extends therethrough to terminate in first a flattened length 27 and finally in a reduced threaded end 28. The shaft 26 has fixed thereon a beveled gear 29 near the bearing 24. A latch or dog 30 is mounted for rotation upon the shaft 26 and is yieldably positioned for frictional engagement with the forward surface of beveled gear 29 by means of compression spring 31 which surrounds the shaft 26 and bears against a washer 32 at the inner surface of the bracket 22. At the outer end of shaft 26 is mounted my novel strip-casting spool 33 so that it will normally revolve with the shaft 26 but when the relative stresses between them exceeds a predetermined degree slippage will occur. The slippage arrangement is attained by a collar 34 having a tubular central portion 35 which terminates in a flattened end 36 so that when mounted upon the shaft 26 the collar 34 will be keyed thereto by engagement of the flattened portion 27 of the shaft 26 with the end 36. The inner face of the collar 34 forms a friction surface which is opposed by a washer 37 which likewise has a slotted central opening adapted to cooperate with the flattened portion 27 of shaft 26. A thumb nut 38 is threadably mounted upon the end 28 of the shaft 26 and bears upon a spring 39 which is interposed between the thumb nut and the washer 37. Since both the collar 34 and the washer 37 are secured against relative rotation with respect to the shaft 26, the spool 33 will turn independently of the shaft 26 only when the frictional tension established by the spring 39 and thumb nut 38 is exceeded. It is obvious that the brake force may be predetermined by adjusting the thumb nut 38. It should be noted that the winding surface 40 at the outer periphery of spool 33 is disposed in alignment with stub shafts 19 and 20 and has a varying radial path about the axis of the spool. The rear portion of my novel spool 33 comprises a circular flange 41 as shown in Fig. 4 and a front oval dome 42 having a uniform ridge 43 projecting beyond the winding surface 40.

Journaled transversely of the shaft 26 and through an opening 44 in yolk 18 is a shaft 45. The inner end of shaft 45 extends within the space 21 and has attached thereto a beveled drive gear 46. This gear is adapted to cooperate with beveled gear 29 to drive the shaft 26 and the spool 33. At the inner face of beveled gear 46 and peripherally disposed are ratchet teeth 47 which in turn coact with the latch 30 to prevent counterclockwise rotation of shaft 45 when viewed in the direction of Fig. 1 or 2. The outer end of shaft 45 extends through a slotted opening 48 formed in a flattened portion 49 formed at the outer surface of shell 16. A crank 55 is secured to the shaft 45 by such means as nut 56 and a detent 57 is mounted upon the shaft 45 so as to be interposed between the flat surface 49 and the handle 55. A compression spring 58 maintains the detent 57 in pressing engagement with the surface 49. The slot 48 forms generally a 90° arc and terminates at its upper portion in an enlarged opening 59 as viewed in Fig. 2. The detent 57 may thus slide upon the face 49 of the shell 16 when moving the shaft 45 upwardly but after the shaft has been moved to its uppermost position the detent 57 will engage the enlarged opening 59 and retain the handle in its uppermost position.

In the operation of my strip-casting reel the bait (not shown) secured to the end of line 13 is adjacent the tip of rod R (not shown). The casting movement is that normally employed by fishermen. The casting position of the reel is that shown in Fig. 2, namely with the axis of shaft 26 aligned generally with the lengthwise disposition of the handle and rod. With the casting movement the bait and line 13 strip from the reel without turning the spool 33, the line merely whipping off the spool in engagement with the tapered inner surface of the opening 11. When the bait has reached its forward desired position, the fisherman may thumb the line 13 and prevent further stripping. When he desires to reel in the bait he grasps the handle 55 in its position shown in Fig. 2 and begins to rotate it in a clockwise direction simultaneously therewith raising the shaft 45. When the shaft 45 reaches its uppermost position the detent 57 engages the opening 59 thereby locking the supporting structure in an upper position with the spool 33 disposed downwardly as shown in Fig. 1. Continued clockwise rotation of the crank 55 winds the line 13 through recess 60 in rim 61 forwardly extending from yoke 18 and coils it upon the winding surface 40 of spool 33. It will be noted, however, that the normal smooth and steady winding of the crank 55, which imparts a steady rotation to the spool 33, will, because of the varying radius at the tangential line position on the winding surface 40, cause a rapid fluttering or jerking motion to the line 13 as it is being retrieved. This motion is designed to impart a lifelike motion to bait attached to the line which will similate the natural activity of live bait when in free circumstance. During this winding-in operation, the latch 30 will be disengaged from the teeth 47 and will move to the dotted line position shown in Fig. 5 where it will be stopped by the inside wall of space 21 and will remain in this position until the shaft 26 rotates in a reverse direction. When the line 13 is pulled out, as when a fish strikes the bait, the reverse direction of rotation of the shaft 26 will immediately throw the latch 30 into engagement with one of the ratchet teeth 47 and any further outward play of line 13 will necessarily be against the brake friction of the spool 33 as determined by the setting of thumb nut 38. Since the tension is automatically accounted for a much lighter weight of line can be employed. Fish weighing as much as thirty pounds have been caught and played upon my apparatus with a monofilm plastic type line having no greater breaking strength than six pounds.

When the line is retrieved for the purpose of casting, the spool, whose axis has been transverse to the longitudinal disposition of the rod and reel as in Fig. 1, will be shifted to casting position as in Fig. 2 by the simple expedient of retracting detent 57 from opening 59 and sliding the shaft 45 to the position shown in Fig. 2. It will be noted that the handle 55, whether in uppermost position shown in Fig. 1 or the lowermost position shown in Fig. 2, will still remain in substantially the same plane of operation and will have moved through such short distance as not to render the mechanism and use thereof cumbersome. My varying radius spool 33 is peculiarly adapted to the form of strip-casting reel here disclosed. I have attempted on occasion to devise a similar arrangement on a reel of ordinary construction which is adapted to unwind in the reverse manner from the winding operation. An eccentric spool in such cases will accentuate the backlash problem which I have eliminated in my strip-casting reel and furthermore renders the spool incapable of thumbing as will be evident to fishermen acquainted with casting reels. Since thumbing, or the frictional manipulation of the spool and line by means of the user's thumb, is essential to good casting with the conventional type reel it will be appreciated that the use of such non-cylindrical or varying radius spool is limited to my type of device. Since the line is thrown outwardly by centrifugal force as it strips from the reel, there is no drag upon the line as it unwinds and this is true even though the forward flange or rib 43 is irregular rather than circular. I find that monofilm plastic line is much more suitable to use in my device than a braided line since twisting, which occurs during casting, is immediately compensated for as the line is being cast forward. Any residual twisting will be further neutralized as the line is being reeled in. In any event, there can be no accumulative twisting which might result in snarling and backlashing as in the case of braided line since the resilient nature of the monofilm line tends to compensate each time the line is cast out.

It will, of course, be understood that various changes may be made in the form, details, arrangement and proportions of the parts without departing from the scope of my invention.

What I claim is:

1. A strip-casting reel comprising a handle and housing member having at the forward portion thereof a diminished tubular opening terminating in an orifice to constitute a line guide, and to the rear of said tubular opening a housing shell defining a space communicating with said tubular opening, a supporting structure disposed in said space across the housing for rocking movement through a 90° arc from a first position to a second position, winding means rotatably mounted upon said supporting structure and having the axis thereof normal to that of the supporting structure, and a crank having a handle, a radial arm and a shaft rotatably mounted upon the supporting structure, said shaft being spaced from the axis of said supporting structure and said handle and radial arm protruding operably from said housing shell for driving connection with said winding means, the plane of rotation of the radial arm of said crank remaining substantially the same with respect to said housing member in both said first and said second positions.

2. A strip-casting reel comprising a handle and housing member having at the forward portion thereof a diminished tubular opening terminating in an orifice to constitute a line guide, and to the rear of said tubular opening a housing shell defining a space communicating with said tubular opening, said housing shell having an arcuate slot lying substantially in a plane parallel to the general longitudinal direction of said handle and housing member, a supporting structure disposed in said space internally of the housing and transverse to the general longitudinal direction of said handle and housing member for rocking movement through a 90° arc from a first position to a second position, winding means rotatably mounted upon said supporting structure and having the axis thereof normal to that of the supporting structure, and a crank member mounted rotatably upon the supporting structure and extending outwardly through said arcuate slot for imparting winding movement to said winding means, the plane of rotation of said crank remaining substantially the same with respect to said handle and housing member in both said first and said second positions.

3. A strip-casting reel comprising a handle and housing member having at the forward portion thereof a diminished tubular opening terminating in an orifice to constitute a line guide, and to the rear of said tubular opening a housing shell defining a space communicating with said tubular opening, said housing shell having disposed through the side thereof an arcuate slot, a supporting structure disposed in said space internally of the housing and transverse to the general longitudinal direction of the handle and housing member for rocking movement through a 90° arc about an axis from a first position to a second position, said axis substantially defining the center for said arcuate slot, winding means rotatably mounted upon said supporting structure and having the axis thereof normal to that of the supporting structure, and a crank mounted upon the supporting structure and extending outwardly through the arcuate slot for imparting winding movement to said winding means, said crank being shiftable in said arcuate slot for moving the supporting structure from said first position to the second position.

References Cited in the file of this patent

UNITED STATES PATENTS

| | | |
|---|---|---|
| 1,572,104 | Budd | Feb. 9, 1926 |
| 2,299,156 | Lind | Oct. 20, 1942 |
| 2,402,882 | Garr | June 25, 1946 |
| 2,425,492 | Severson | Aug. 12, 1947 |
| 2,504,550 | Letzkus | Apr. 18, 1950 |
| 2,512,170 | Oen | June 20, 1950 |
| 2,521,543 | Shakespeare et al. | Sept. 5, 1950 |
| 2,549,029 | Stalder | Apr. 17, 1951 |
| 2,551,320 | Ferguson | May 1, 1951 |
| 2,559,215 | Funk | July 3, 1951 |
| 2,634,920 | Dunn | Apr. 14, 1953 |